United States Patent [19]

Hill

[11] Patent Number: 4,965,937

[45] Date of Patent: Oct. 30, 1990

[54] TOOL JOINT GAUGE

[76] Inventor: Tom H. Hill, 11722 Quail Creek, Houston, Tex. 77070

[21] Appl. No.: 251,233

[22] Filed: Sep. 30, 1988

[51] Int. Cl.$^5$ .............................................. G01B 3/48
[52] U.S. Cl. .................................... 33/199 R; 33/829; 33/795
[58] Field of Search ................ 33/794, 795, 827, 829, 33/199 R, 531

[56] References Cited

U.S. PATENT DOCUMENTS

| | | | |
|---|---|---|---|
| 3,296,705 | 1/1967 | Johnson | 33/199 R X |
| 4,330,944 | 5/1982 | Maisenbacher et al. | 33/199 R |
| 4,479,306 | 10/1984 | Klementich | 33/199 R |
| 4,567,670 | 2/1986 | Roulstone | 33/199 R X |

Primary Examiner—Harry N. Haroian
Attorney, Agent, or Firm—Carlos A. Torres

[57] ABSTRACT

A gauge to evaluate the flatness, planar disposition, and location of the sealing surface of a rotary shouldered threaded connection, the gauge being adjustable and convertible to gauge either pin or box ends of different size connections, with multiple contact shoes engaging the connection threads to hold the gauge fixed relative to the thread pitch diameter and a device to measure distances from the pitch diameter to the shoulder face. In the method, the gauge is moved around the connection to obtain measurements from different circumferential locations to evaluate shoulder flatness and axial location and to examine the angular disposition of the plane of the shoulder face relative to the thread axis.

13 Claims, 3 Drawing Sheets

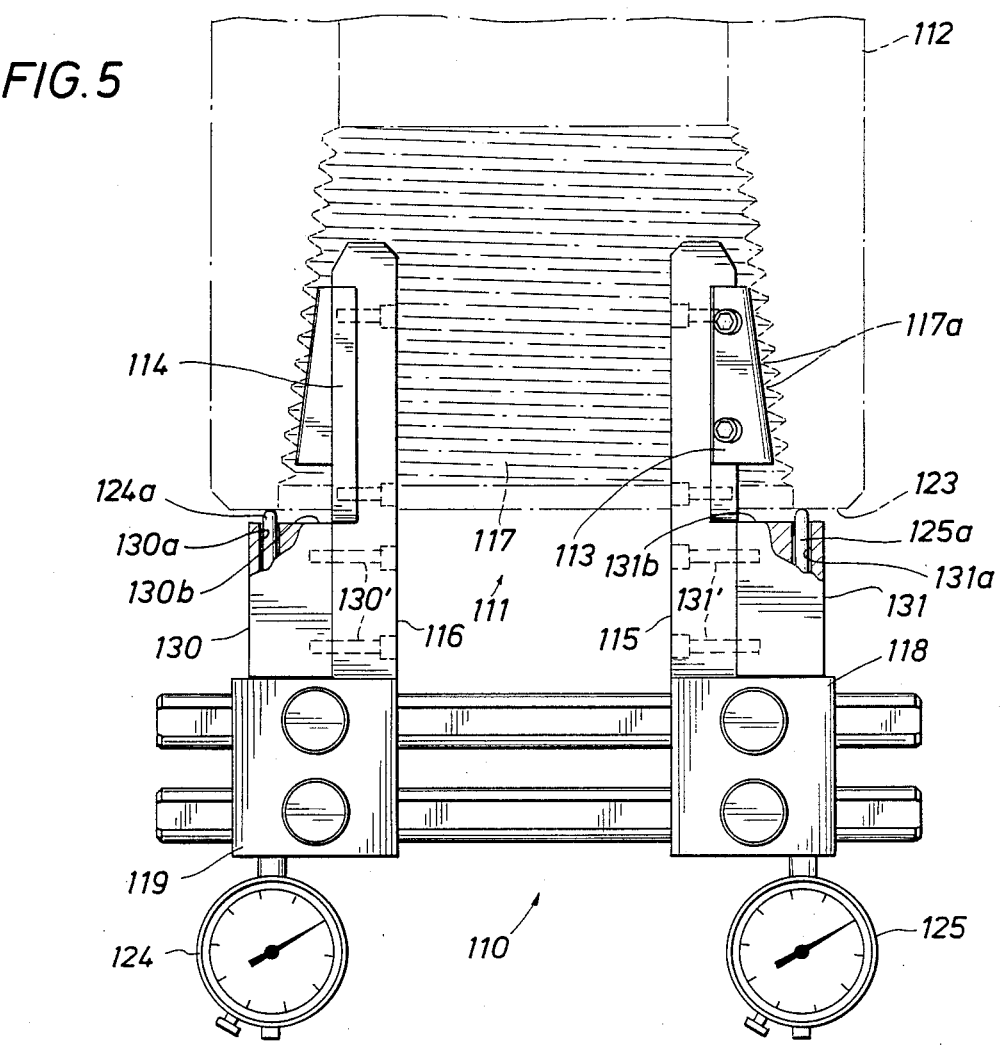
FIG. 5
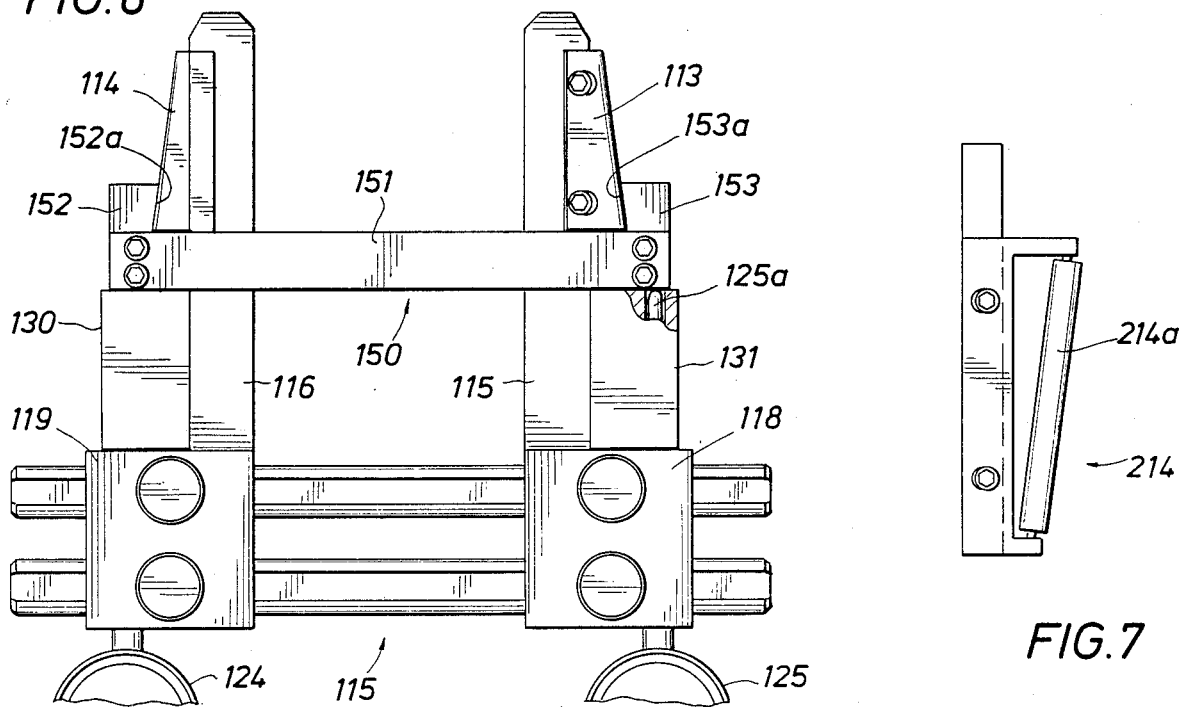
FIG. 6
FIG. 7

TOOL JOINT GAUGE

BACKGROUND OF THE INVENTION

1. Field of the Invention

The present invention relates to gauging means and methods for evaluating connectors on pipe used to drill oil and gas wells.

Drill strings used to bore well holes into the earth are constructed from individual lengths, or joints, of pipe which are connected together by threaded "rotary shouldered" connections formed at the ends of the joint. The drill pipe joints are typically 30 feet in length and may be assembled to form a drill string extending as much as 30,000 feet or longer. The connection at one end of the joint has internal threads and is referred to as the box. The connection at the opposite end is externally threaded and is called the pin. The end connections of drill pipe are also commonly referred to as "tool joints".

The end connections typically have helical threads with an annular shoulder formed at the base of the thread helix. When the threads of mating joints are screwed together, they function to hold the joints to each other and draw the shoulders of the pin and box into firm engagement. The pin and box shoulders, when properly engaged, seal against each other to prevent leakage and also function to evenly distribute forces created as the drill string is rotated during the drilling operation. Proper engagement requires, in part, that each shoulder surface have a uniform annular form and a smooth planer face which is perpendicular to the axis of the thread helix. The shoulder surface must be positioned at the correct axial position along the thread helix to ensure that mating connections will properly engage and shoulder up when they are tightened together.

Dimensions and tolerances for rotary shouldered connections have been established by the petroleum well drilling industry. The standards are the *American Petroleum Institute Specification 7 for Rotary Drilling Equipment* (A.P.I. Spec. 7) for new connections and the *American Petroleum Institute Recommended Practices for Drill Stem Design and Operating Limits* (A.P.I. RP7G) for used connections. The typical rotary shouldered connection has threads which are formed along an imaginary conical surface, or pitch cone. The taper of the threads and the cone length as well as other variables and tolerances in the thread form are set forth in A.P.I. Spec. 7. The position of the shoulder face is defined relative to a specific diameter of the thread pitch cone known as the "pitch diameter".

During handling and use of the drill string, shoulder faces are sometimes damaged so that the connection no longer meets the cited specifications. Shoulder damage must be repaired to prevent leakage and structural damage. Repairs are often performed in the field using hand operated "refacing" tools. If too much metal is removed during the refacing operation, the seal face will be too far from the pitch diameter in the case of the pin and too close to the pitch diameter in the case of the box. In either case, the mating pin and box will screw together too far before their shoulders engage causing the connection to be improperly stressed by the resulting excessive radial interference between the two members. In addition, this excessive box/pin overlap may result in inadequate shoulder engagement, potential leaks and structural damage.

Improper alignment of the shoulder's sealing surface with the thread axis may also prevent proper engagement of the surfaces when the joint is madeup resulting in leakage and structural damage in one or both connections.

2. Description of the Prior Art

One of the major difficulties in field inspection of rotary shouldered connections is identifying shoulders which have had too much material removed during refacing, or, which have been improperly refaced so that their faces are no longer perpendicular to the thread axis. This difficulty stems from the fact that the tolerances are relatively small and discrepancies can not normally be detected by visual inspection or with the use of common measuring devices. While machining gauges and other precision instruments are available for use during the machining of the connection, they are generally not practical for field use. Ring and plug gauges, for example, which are common machine shop gauges, are delicate and expensive. A different ring or plug gauge is needed for each type and size connection to be gauged. Moreover, the presence of even minor connection damage present from normal usage of the pipe can prevent the gauges from operating properly even though the damage may not be sufficient to render the connection defective. In like manner, even small amounts of rust or debris in the connection threads can prevent the ring and plug gauges from operating properly. Wavy shoulder surfaces may also be difficult to detect wIth many ring and plug gauges.

The use of common measuring devices to detect defects is also difficult since the primary reference for the shoulder location is the connection's pitch diameter which is not physically marked on the connection. Measurements made from readily identifiable bench marks, such as the pin end or the end of perfect threads in the box, are not sufficiently accurate. Other bench marks intended for this purpose are frequently not present on connections and when present, do not aid in identifying planar seal faces which are not perpendicular to the thread axis.

SUMMARY OF THE INVENTION

The gauge of the present invention provides a quantitative measurement of the distance from the pitch diameter of a threaded, rotary shouldered connection to the annular shoulder seal. In its preferred embodiment, the measurement may be made over the 360 degree face of the seal to ensure that the seal face is perfectly flat and that the plane of the seal face forms a right angle with the thread axis. One form of the invention employs multiple pads which provide circumferencially spaced line contact with the thread crests. The pads position the gauge at a known location on the connection threads and hold the gauge steady while measurements from the gauge to the shoulder are made.

The preferred form of the gauge also enables taper measurements to be made. To this end, the pad faces are fixed at an angle to the gauge so that the faces will conform to the thread crests of correctly tapered threads when the gauge is placed on the connection. Failure of the pad faces to engage all of the underlying thread crests indicates that the pitch cone may be improper.

The gauge components are reversible and interchangeable so that a single gauge may be used to gauge both pin and box connections.

The gauge may be adjusted for gauging different size connections with the use of calibration standards. The spacing between contact points on the gauge is adjusted using a standard for the type and size connection to be gauged.

OBJECTS OF THE INVENTIONS

A primary object of this invention is to provide a field instrument for detecting defects in the dimensions, locations and planar orientations of the shoulder faces of rotary shouldered connections.

A general object of this invention is to provide a method and means to measure the distance from a specific thread diameter to the seal facing on a rotary shouldered connection and to detect and measure any improper orientation of the plane of the seal face relative to the axis of the connection threads.

It is also an object of this invention to provide a single device which is suitable for use on a variety of different size and type rotary shouldered connections to determine if the shoulder face is properly located and properly oriented relative to the thread axis of the connection.

An important object of the present invention is to provide a gauge which can be used to measure the seal face placement relative to the pitch diameter of a shouldered connection and to measure the orientation of the seal face relative to the thread axis of such a connection.

It is also an object of the invention to provide a single gauge which can be adjusted to evaluate shoulder location, flatness and disposition for a variety of different size and type threaded connections.

Another object of the invention is to provide a single gauge which gauges thread pitch diameter and taper as well as shoulder face location, flatness and orientation.

An important object of the present invention is to provide a single gauge for evaluating the shoulder face on the pin and the box of a rotary shouldered connection.

These and other objects and features of the invention may be more fully appreciated and understood from the following descriptions and drawings.

DESCRIPTION OF THE DRAWINGS

FIG. 5 is a side elevational view, partly in section, illustrating a modified form of the gauge of the present invention configured to gauge the box end of a rotary shouldered connection;

FIG. 6 is a side elevational view, partly in section, showing the gauge of FIG. 5 as it appears when being calibrated on a box end setting standard; and FIG. 7 is a detailed side view of a modified pad used in the gauge of the present invention.

DESCRIPTION OF THE ILLUSTRATED EMBODIMENTS

Figure 1:
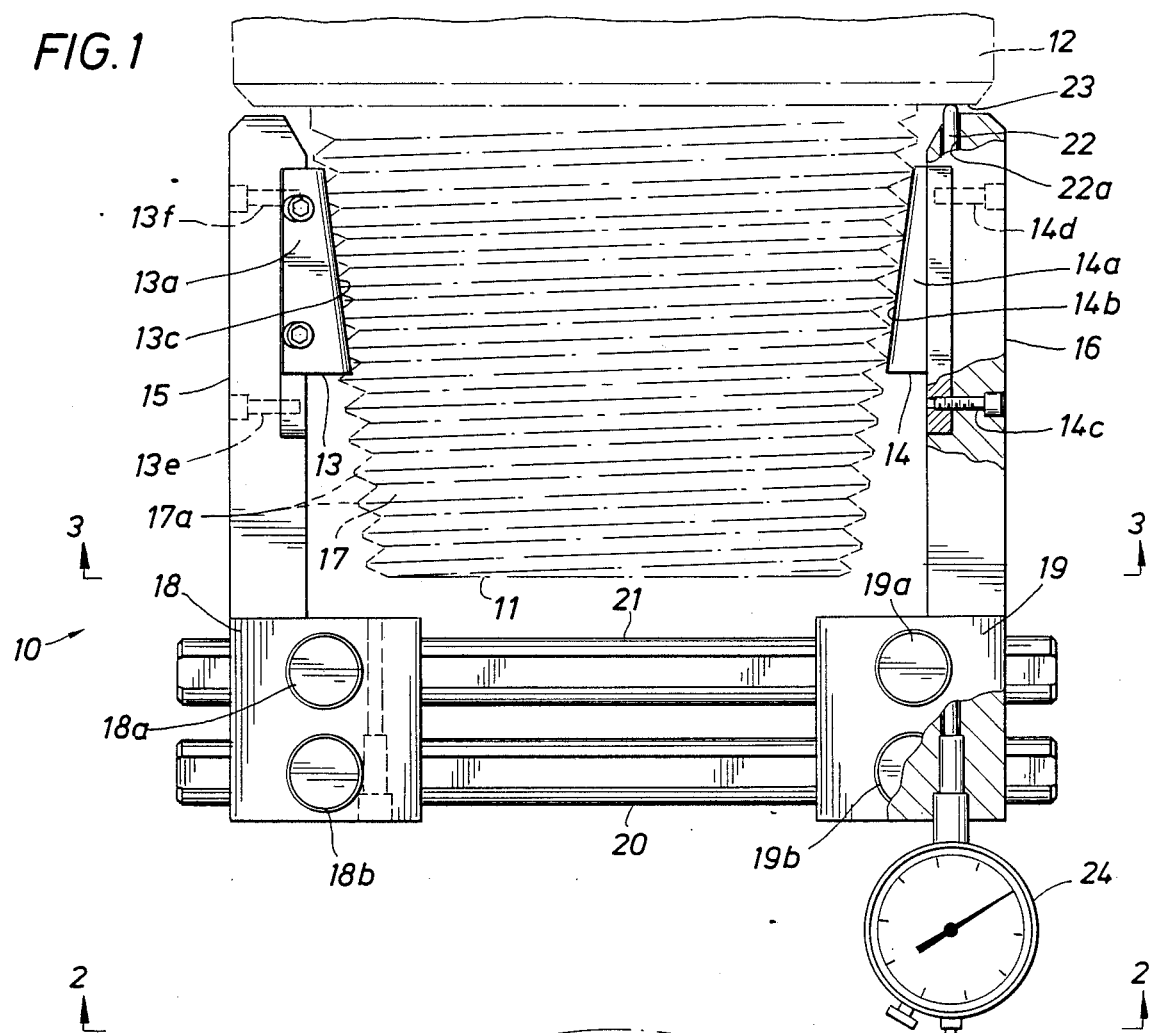
FIG. 1 is a side elevational view, partly in section, of one form of the gauge of the present invention disposed on the pin end of a rotary shouldered connection.
Figure 2:
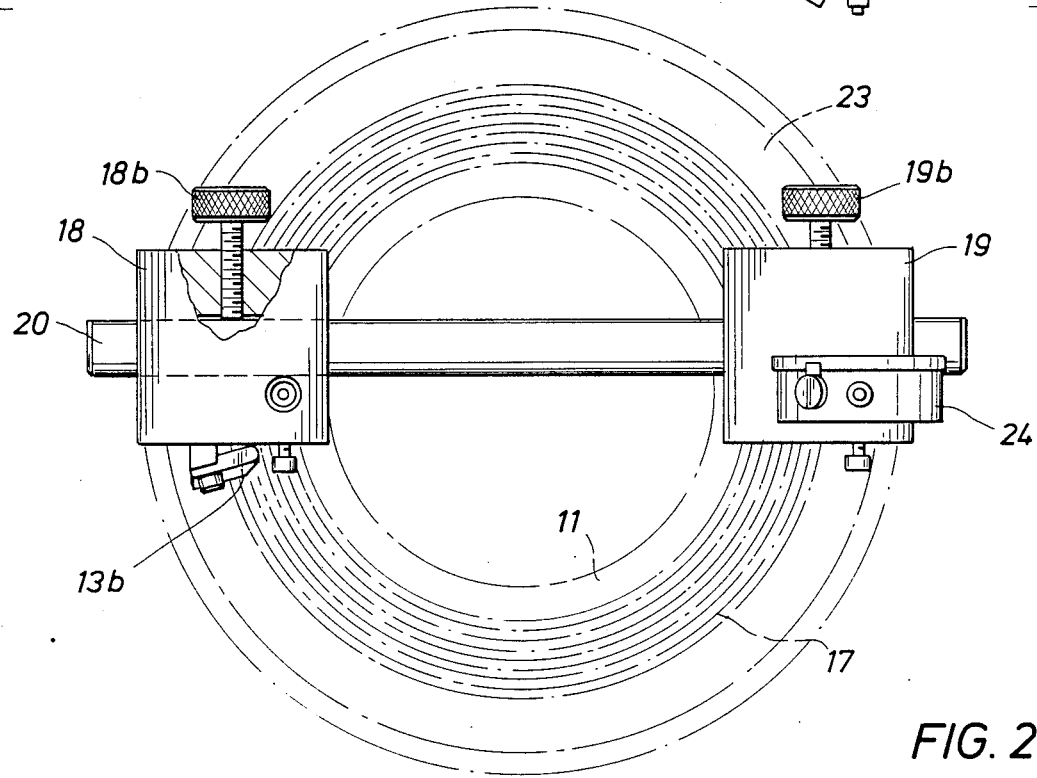
FIG. 2 is an end view, partly in section, taken along the line 2—2 of FIG. 1.
Figure 3:
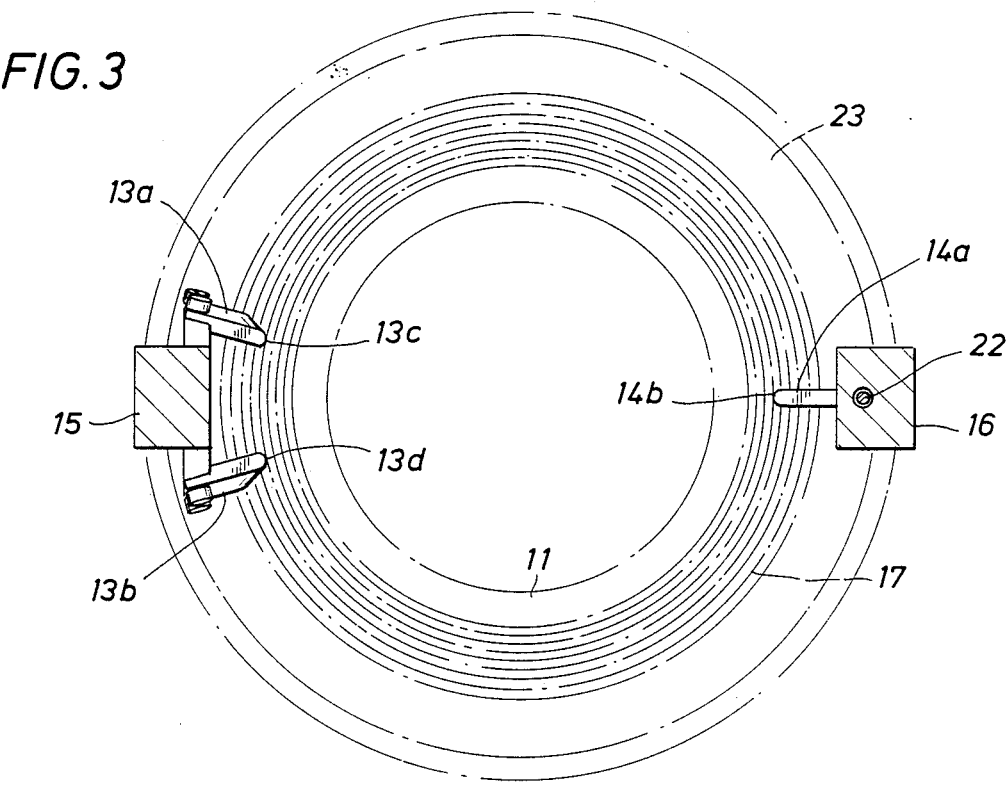
FIG. 3 is a partial cross-sectional view taken along the line 3—3 of FIG. 1.

FIG. 1 shows a gauge 10 of the present invention in position against a pin 11 of a rotary shouldered connection 12. Locating shoes 13 and 14 carried respectively by arms 15 and 16 contact pin thread crests 17a of threads 17. The arms 15 and 16 extend from blocks 18 and 19 which in turn are held together by bars 20 and 21. As may be seen with joint reference to FIGS. 1 and 3, the shoe 13 has two pads 13a and 13b and the shoe 14 has a single pad 14a. The three pads, 13a, 13b, and 14a, have end faces 13c, 13d, and 14b respectively. Each face forms a straight line which is inclined to make line contact with the tapering thread crests 17a. The shoes 13 and 14 are held to the arms 15 and 16 by screws 13e, 13f and 14c, 14d, respectively. As will be appreciated, the shoes may be replaced by shoes with pads having any desired taper angle.

The shoes 13 and 14 may be moved toward or away from each other by moving the blocks 18 and 19 over the bars 20 and 21 which extend through holes bored through the blocks. When the pads are properly spaced from each other, they may be locked in place with thumb set screws 18a, 18b, and 19a, 19b.

A spring loaded plunger 22 extends axially through a passage 22a formed in the block 19 and arm 16 and into engagement with a pin shoulder 23. A conventional dial gauge indicator 24 connected to the plunger 22 responds to axial plunger movement to provide a measuring means which measures the distance from the gauge to the shoulder.

In operation, the gauge 10 is calibrated and then positioned over the threads 17 of the pin 11 with the pads of shoes 13 and 14 in contact with the thread crests 17a. The pad end faces 13c, 13d, and 14b are arranged on the gauge 10 such that, if extended, the lines formed by the end faces would intersect at a single point on the thread axis corresponding to the apex of a conical surface defined by the thread crests of a correctly formed connection.

When applied to correctly tapered and formed threads, the end faces 13c, 13d, and 14b will touch all of the underlying thread crests 17a of the connection. Contact along three circumferentially spaced lines provided by the pads also ensures that the gauge is properly centered and that it will remain stationary during the gauging procedure. Since the pads do not interlock with the connection threads, it will be appreciated that the gauge may be rotated about the connection without changing the position of the pads relative to the connection pitch diameter.

Figure 4:
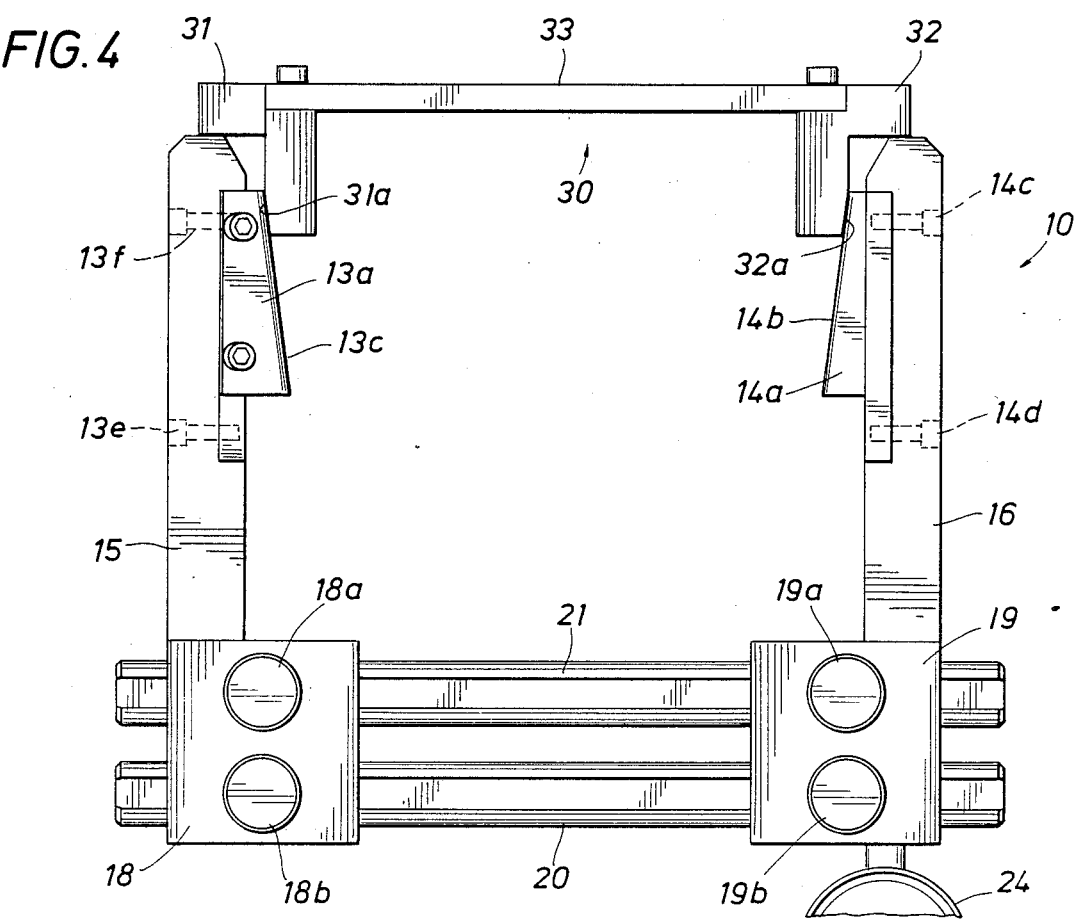
FIG. 4 is a side elevational view showing the gauge of FIG. 1 in position on a pin calibration standard.

FIG. 4 illustrates the gauge 10 being calibrated with a pin calibration standard 30. The standard 30 includes two end pieces 31 and 32 held together by a bar 33. The end pieces 31 and 32 have specially tapered setting surfaces 31a and 32a, respectively, which are designed to engage and conform to the pad end faces 13c, 13d, and 14b.

In use, the standard 30 is positioned against the ends of the arms 15 and 16 as illustrated in FIG. 4 and the arms 15 and 16 are moved over the rods 20 and 21 until the faces 13c, 13d and 14b contact and are exactly aligned with the appropriate setting surfaces 31a and 32a. The thumb screws 18a, 18b, and 19a, 19b are tightened to hold the shoes and their pads in calibrated position. Once calibrated, the standard 30 may be removed to enable the gauge to be used as previously described.

FIG. 5 illustrates a modified form of the gauge 110 configured to gauge a box 111 of a rotary shouldered connection 112. Shoes 113 and 114 are secured to arms 115 and 116 to engage box threads 117 along thread crests 117a. The shoe 113 employs two pads and the shoe 114 employs a single pad. The pads function as with the previously described embodiment, to hold the gauge 110 at a fixed position relative to the pitch diameter of the threads 117.

Dual indicators 124 and 125 mounted on blocks 119 and 118 respectively, provide a quantitative measurement of the distance from the fixed, known position on the gauge 110 to the connection shoulder 123. Guide blocks 130 and 131 are secured to the arms 116 and 115, respectively, by screws 130' and 131' to provide guide bores 130a and 131a for gauge plungers 124a and 125a. The plungers, which are connected to their respective dial indicators, function conventionally to provide a measurement of the distance from the block bases 130b and 131b to the shoulder face 123.

To perform the gauging operation, the gauge 110 is placed on the box 111 and rotated to different circumferential positions about the thread axis. Fluctuations in the indicator readings show the angular disposition and flatness of the plane of the shoulder relative to the thread axis. If both gauge readings are the same at all circumferential settings, the shoulder plane is flat and at right angles to the thread axis. Changes in gauge readings indicate unevenness and may also indicate that the shoulder face (or portions of it) is not at a right angle to the thread axis.

The indicators also provide a quantitative measure of the distance from the block faces 130b and 131b to the shoulder 123 which determines if too much metal has been removed from the shoulder 123. While the form of the invention illustrated in FIG. 5 employs two dial indicators, it should be noted that the gauge may be employed with only a single indicator (not illustrated). The use of two indicators contributes to the speed and ease of operation of the gauging process. Correspondingly, dual indicators (not illustrated) may be used on the pin gauge illustrated in FIG. 1.

FIG. 6 illustrates the gauge 110 being calibrated with a box calibration standard 150. A bar 151 holds end pieces 152 and 153 a fixed distance from each other. The end pieces have tapered faces 152a and 153a. During calibration, the arms 115 and 116 are adjusted and locked in the illustrated position with the end piece faces 152a and 153a engaging the correspondingly tapered pads of shoes 114 and 113, respectively. As with the pin calibration standard described previously, the taper angle of the pads and end pieces and the spacing between the end pieces of the calibration standard are selected to match those of the size and type tool joint to be gauged.

The dial indicator is adjusted to read a fixed, predetermined value, such as zero, with the calibration standard in place. When the gauge is positioned on the tool joint and the spring biased plungers are extended to the shoulder face, the reading on the indicator will establish the distance from the thread pitch diameter to the shoulder face.

A modified form of shoe 214 is illustrated in FIG. 7. The shoe 214 includes two rollers 214a (only one visable). Rollers such as 214a may replace the pads of the previously described forms of the invention to aid in rotating the instrument on the tool joint during the gauging operation.

While preferred forms of a rotary shouldered connection gauge have been described in the foregoing specification and related drawings, it will be appreciated that other forms of the gauge may be made and used without departing from the spirit of the invention.

I claim:

1. A gage to measure the distance from a specific pitch diameter to the shoulder face of a rotary shouldered connection having tapered threads comprising:
   a. positioning means, including pads having linearly extending end faces tapered to form line contact with thread crests on said connection to position the gauge on the connection at a known place relative to said specific pitch diameter to form the effective reference for the gauge; and
   b. measuring means connected with said positioning means and movable to multiple positions over said shoulder face to measure the distance from the gauge to said shoulder face at each of said multiple positions.

2. A gage as defined in claim 1 wherein said positioning means includes at least three, circumferentially-spaced, pads for holding the gage at a central location on said connection.

3. A gage as defined in claim 1 wherein said measuring means includes a dial indicator.

4. A gage as defined in claim 1 wherein said measuring means includes continuously reading measuring means to provide continuous measurement to said shoulder face through 360 degrees of gage movement.

5. A gage as defined in claim 2 wherein said measuring means includes a dial indicator.

6. A gage as defined in claim 5 wherein said measuring means includes continuously reading measuring means to provide continuous measurement to said shoulder face through 360 degrees of gage movement.

7. A gage as defined in claim 1 wherein said measuring means includes multiple dial indicators.

8. A gage as defined in claim 1 wherein said gage includes adjustment means to change the location of said positioning means to accommodate different sized connections and locking means for locking said positioning means at a selected location whereby movement of said positioning means relative to said gage is prohibited.

9. A gage as defined in claim 4 wherein said gage includes adjustment means to change the location of said positioning means to accommodate different sized connections.

10. A gage as defined in claim 1 including converting means for converting said gage to measure pin or box ends of said rotary shouldered connection.

11. A gage as defined in claim 4 including converting means for converting said gage to measure pin or box ends of said rotary shouldered connection.

12. A gage as defined in claim 8 including converting means for converting said gage to measure pin or box ends of said rotary shouldered connection.

13. A gauge for evaluating a rotary shouldered connection, said connection having a thread cone with tapered threads formed about a central axis and an annular shoulder seal at the base of the threads comprising:
   a. locating means rotatable abut said central axis of said connection, said locating means including pads having linearly extending end faces tapered to form line contact with thread crests in said connection to position the gauge at a known location relative to a specific length diameter of said thread cone to form the effective reference for the gauge; and
   b. continuous reading measuring means to measure the position of the shoulder seal relative to said specific length diameter at multiple circumferential points about said central axis.

* * * * *